US008570432B2

(12) United States Patent
Yamashita

(10) Patent No.: US 8,570,432 B2
(45) Date of Patent: Oct. 29, 2013

(54) FOCUS ADJUSTMENT APPARATUS AND IMAGE CAPTURING APPARATUS

(75) Inventor: Yuichiro Yamashita, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 13/191,736

(22) Filed: Jul. 27, 2011

(65) Prior Publication Data

US 2012/0057072 A1 Mar. 8, 2012

(30) Foreign Application Priority Data

Sep. 6, 2010 (JP) ................................ 2010-199406

(51) Int. Cl.
*G03B 13/00* (2006.01)

(52) U.S. Cl.
USPC .......................................... 348/349; 396/459

(58) Field of Classification Search
USPC ................. 348/345, 349, 351, 353, 354, 355, 348/356
See application file for complete search history.

(56) References Cited

U.S. PATENT DOCUMENTS

| | | | | |
|---|---|---|---|---|
| 6,700,615 B1 * | 3/2004 | Satoh | | 348/345 |
| 7,054,499 B2 * | 5/2006 | Watanabe | | 382/255 |
| 7,231,143 B2 * | 6/2007 | Toji | | 348/345 |
| 7,881,551 B2 * | 2/2011 | Paik et al. | | 382/260 |
| 2003/0063815 A1 * | 4/2003 | Watanabe | | 382/255 |
| 2004/0227839 A1 * | 11/2004 | Stavely et al. | | 348/345 |
| 2006/0092314 A1 * | 5/2006 | Silverstein et al. | | 348/349 |
| 2007/0242142 A1 * | 10/2007 | Okazaki | | 348/239 |
| 2010/0007718 A1 * | 1/2010 | Rohaly et al. | | 348/345 |
| 2010/0053417 A1 * | 3/2010 | Baxansky | | 348/345 |
| 2010/0118142 A1 | 5/2010 | Ohsawa | | |
| 2010/0259670 A1 * | 10/2010 | Mohan et al. | | 348/349 |
| 2010/0309362 A1 * | 12/2010 | Nagata | | 348/335 |
| 2011/0017827 A1 * | 1/2011 | Hayashi et al. | | 348/345 |
| 2011/0043666 A1 * | 2/2011 | Mitsumoto | | 348/241 |
| 2011/0096981 A1 * | 4/2011 | Arnison et al. | | 382/151 |
| 2011/0292275 A1 * | 12/2011 | Kawamura | | 348/345 |
| 2012/0148108 A1 * | 6/2012 | Yahata | | 382/106 |

FOREIGN PATENT DOCUMENTS

| | | | |
|---|---|---|---|
| JP | 06-181532 A | | 6/1994 |
| JP | 11-344661 A | | 12/1999 |
| JP | 2000-152064 A | | 5/2000 |
| JP | 2002-116372 A | | 4/2002 |
| JP | 2008058546 A | * | 3/2008 |
| JP | 2010-039448 A | | 2/2010 |
| JP | 2010081460 A | * | 4/2010 |

* cited by examiner

*Primary Examiner* — John Villecco
(74) *Attorney, Agent, or Firm* — Fitzpatrick, Cella, Harper & Scinto

(57) ABSTRACT

A focus adjustment apparatus for performing focus adjustment using a captured image and a plurality of point spread functions prepared in advance for each defocus direction and defocus amount is provided. The apparatus includes a focus adjusting stop whose aperture does not have rotational symmetry about an optical axis. Focus adjustment is performed by comparing the plurality of point spread functions prepared in advance with a point spread function of an image captured using the focus adjusting stop and not having rotational symmetry about the optical axis, obtaining the defocus direction and the defocus amount, and performing the focus adjustment according to the obtained defocus direction and defocus amount.

4 Claims, 4 Drawing Sheets

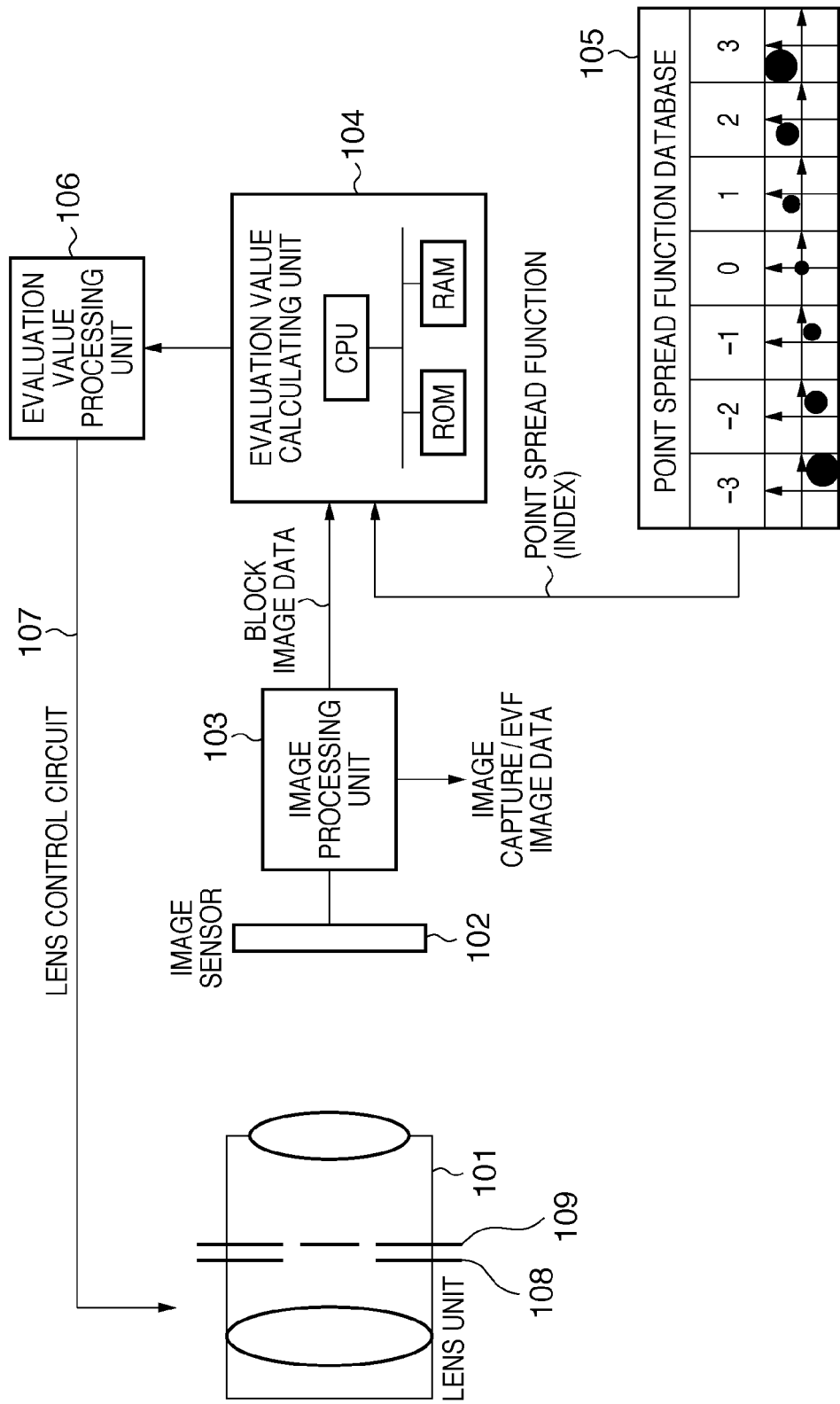

F I G. 2A
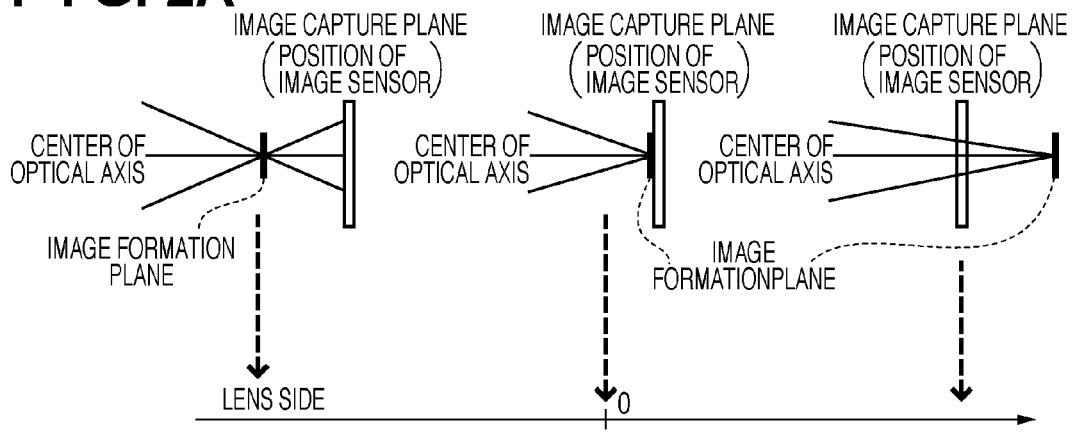
F I G. 2B
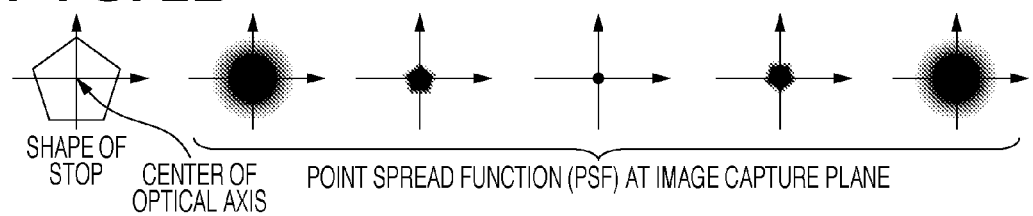
F I G. 2C
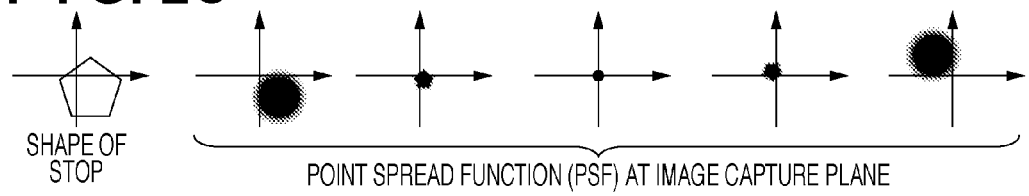
F I G. 2D
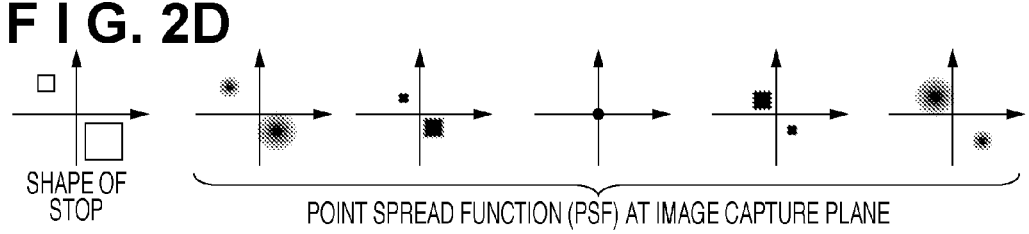
F I G. 2E 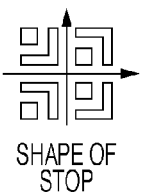
F I G. 2F 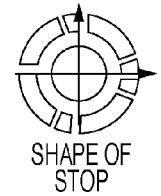

FOCUS ADJUSTMENT APPARATUS AND IMAGE CAPTURING APPARATUS

BACKGROUND OF THE INVENTION

1. Field of the Invention

The present invention relates to a focus adjustment apparatus and an image capturing apparatus, in particular, to a focus adjustment apparatus and an image capturing apparatus capable of rapidly bringing subjects into focus for image capture.

2. Description of the Related Art

As a focusing technique used for film cameras and digital cameras, there is a focus adjustment technique using evaluation functions, such as point spread functions respectively corresponding to focus positions of a lens, and a database of characteristic values of defocus to calculate the focus position relative to a subject image. Specifically, in Japanese Patent Laid-Open No. 06-181532, point spread function data corresponding to focus positions are databased in advance. Subject images in which the amounts of defocus are uncertain are actually obtained, data on the subject images is Fourier transformed, and data obtained by dividing the Fourier transformed data by the point spread functions is inversely Fourier transformed to obtain restored images. Then the focus position corresponding to the point spread function which produces the smallest error value of the restored images obtained by the Fourier transformation, is determined as its focus position relative to a real image. Then, the lens is moved to a desired position based on the determined focus position. However, when carrying out a higher-accuracy focus adjustment by using such a technique, it is needed to prepare a large number of point spread functions in advance corresponding to slight differences in the lens positions. And further, it is also needed to make vast quantities of calculations at times of divisions by point spread functions, inverse Fourier transformations, and extractions of error values, and therefore there is also a possibility that it takes much time to adjust the focus of the lens.

Japanese Patent Laid-Open No. 2000-152064 has proposed a method for overcoming a delay in focus adjustment due to such problems, i.e., an increase in storage capacity and calculation quantity for provision of many point spread functions. This document describes adoption of a technique of combining rough control for movement to an in-focus position using point spread functions and fine control by a hill-climbing detection method or a technique of determining the infinite-distance focus position or minimum-distance focus position as its initial focus position to limit the number of its determinable focus positions.

SUMMARY OF THE INVENTION

In the solution disclosed in Japanese Patent Laid-Open No. 2000-152064, a one-shot AF function provided in Japanese Patent Laid-Open No. 06-181532 is compromised in favor of a reduced storage capacity for point spread functions and a shortened time for in-focus position determination. In Japanese Patent Laid-Open No. 2000-152064, for example, image capture is performed a plurality of times, time is required to move the lens to the predetermined initial focus position at the time of each focus adjustment and to move the lens between the infinite-distance focus position and the minimum-distance focus position, and therefore high speed focus adjustment cannot be implemented.

One aspect of the present invention provides a technique for uniquely determining the direction of movement of a lens and the distance traveled by the lens so as to bring a subject into focus even in a state in which the lens is positioned at any initial focus position, by making a small quantity of data calculations after one-time image capture to shorten the time taken to adjust the focus.

An aspect of the present invention provides a focus adjustment apparatus for performing focus adjustment using a captured image and a plurality of point spread functions prepared in advance for each defocus direction and defocus amount, comprising a focus adjusting stop whose aperture does not have rotational symmetry about an optical axis, wherein focus adjustment is performed by comparing the plurality of point spread functions prepared in advance with a point spread function of an image captured using the focus adjusting stop and not having rotational symmetry about the optical axis, obtaining the defocus direction and the defocus amount, and performing the focus adjustment according to the obtained defocus direction and defocus amount.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a diagram of a configuration example of a focus adjustment apparatus and an image capturing apparatus according to an embodiment, FIGS. 2A to 2F are diagrams showing examples of a shape of a focus adjusting stop used in an embodiment of, FIG. 3 is a flowchart of a procedure of focus adjustment by the focus adjustment apparatus according to an embodiment.

DESCRIPTION OF THE EMBODIMENTS

Figure 3:
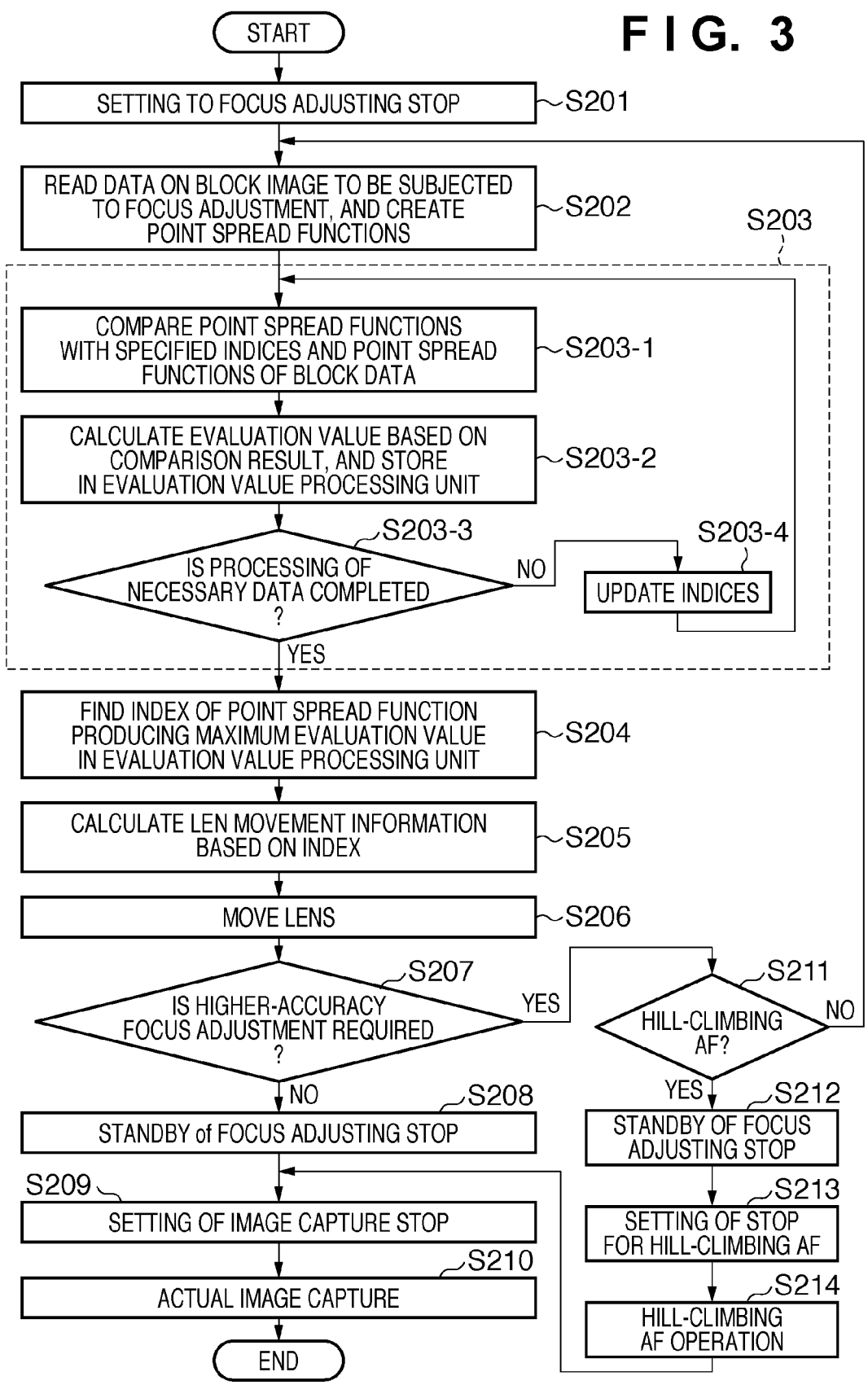

<Configuration Example of a Focus Adjustment Apparatus and an Image Capturing Apparatus According to an Embodiment>

FIG. 1 is a diagram of a configuration example of a focus adjustment apparatus according to an embodiment of the present invention and an image capturing apparatus provided with the focus adjustment apparatus. The image capturing apparatus includes a lens unit 101, an image sensor 102, an image processing unit 103, and an evaluation value calculating unit 104. The evaluation value calculating unit 104 selects image data from an area neighboring a position brought into focus in an image screen as block image data, and performs a mathematical operation on the block image data by use of point spread functions or comparison with a database 105 created based on point spread functions to generate block image evaluation values. The evaluation value calculating unit 104 includes a CPU, a ROM, and a RAM, for example, and may be realized by the CPU executing a program. The CPU may also execute processing as the evaluation value processing unit 106. Examples of a method for obtaining block image data include a method of selectively reading only data from necessary regions in still images and moving images before ordinary capture of those images and a method of selectively cutting out a part of an image used for moving image recording and electronic viewfinder-mode display. The size of a block of image data is basically a matter of design, and for example, a block may be designed so as to have a size at which images are of a certain contrast. The size of the block may be changed in accordance with the sizes of subjects. The evaluation values are sent to the evaluation value processing unit 106. The evaluation value processing unit 106 determines the direction of defocus and the amount of defocus, and then the focus position of the lens is controlled based on a lens control signal 107. The lens unit 101 includes an image capturing stop 108 and a focus adjusting stop 109.

<Shape Examples of Focus Adjusting Stops According to an Embodiment>

In this embodiment, shapes of focus adjusting stops that permit high speed focus adjustment will be described below with reference to FIGS. 2A to 2F. FIG. 2A is a schematic view of an optical system in which image sensing planes are shifted away from and towards image planes. FIGS. 2B to 2D show how the shapes of three different stops are reflected in point spread functions in the states shown in FIG. 2A.

FIG. 2B shows a case where the aperture of the stop has rotational symmetry about the optical axis and the centroid of intensity of light transmittance at the stop coincides with the optical axis. In this case, between a case where the image sensing plane is shifted forward from the focus adjusted position (the left-hand illustration of FIG. 2A) and a case where the image sensing plane is shifted backward from the focus adjusted position (the right-hand illustration of FIG. 2A), there is little symmetrical difference in the point spread function with respect to the in-focus position. Therefore, it is unapparent from the point spread functions in which direction the lens should be moved from its current focus position.

On the other hand, in the case where the aperture of the stop selected in FIG. 2C does not have rotational symmetry about the optical axis and the centroid of intensity of light transmittance at the stop does not apparently coincide with the optical axis, different point spread functions can be obtained between a case where the image sensing plane is shifted forward from the focus adjusted position and a case where the image sensing plane is shifted backward from the focus adjusted position, and the direction and the amount of movement of the lens are uniquely determined from the point spread functions. Also, regarding the stop selected in FIG. 2D in which two or more apertures are provided, the centroid of intensity of light transmittance at the stop does not coincide with the optical axis. In this case as well, point spread functions having different configurations can be obtained between a case where the image sensing plane is shifted forward from the focus adjusted position and a case where the image sensing plane is shifted backward from the focus adjusted position. Note that although the case where two apertures are provided is described in this embodiment, there is no limitation on the number of apertures, as long as two or more apertures are provided. The above wording "different configurations" is defined using dissimilarity between two different point spread functions, and can be defined using, for example, integral values of absolute values of differences between point spread functions or the total energy of the point spread functions relative to Euclidean distance. Further, FIGS. 2E and 2F show examples of other stop shapes. The aperture of these stops do not have rotational symmetry about the optical axis while the centroid of intensity of light transmittance at the stops coincide with the optical axis.

In the above embodiment, the use of a dedicated focus adjusting stop has been described, but capturing still images and moving images and operating electronic viewfinders using the focus adjusting stops of FIGS. 2C to 2F is not excluded. Although it may be difficult to capture a high-quality image due to the appearance of a specific pattern depending on the shape of the stop in an out-of-focus image, the focus adjusting stop may be used in accordance with the desired image quality. Further, the above specific pattern in the out-of-focus image may be eliminated by image processing or the like. Moreover, the dedicated focus adjusting stop described above can also be implemented by, for example, providing a conventional stop mechanism with a blade(s) that operates only when acquiring image data evaluation values as an auxiliary stop or fitting a mechanical mask that operates only when acquiring image data evaluation values near a conventional stop mechanism.

<Procedure Example of Focus Adjustment by Focus Adjustment Apparatus According to an Embodiment>

FIG. 3 is a flowchart of the procedure of focus adjustment according to an embodiment of the present invention. Such a procedure is executed at the evaluation value calculating unit 104 and the evaluation value processing unit 106 of FIG. 1. For example, the procedure can be collectively executed by the CPU of the evaluation value calculating unit 104. At step S201, a shift from an image capture mode, an electronic viewfinder mode, or the like, to focus adjustment mode is conducted. At that time, setting of the focus adjusting stop 109 is performed. For setting the stop, it is possible to operate the image capturing stop for focus adjustment, use another stop, or the like. In this embodiment, the focus adjustment operation is speeded up by providing the focus adjusting stop with a characteristic shape. The characteristics of the shape have been described earlier with reference to FIGS. 2A to 2F. Then, in step S202, a block image is acquired from a subject image which a user wishes to bring into focus within the viewfinder. The block image may be acquired by the image sensor 102, or may be cut out by the image processing unit 103. Thereafter, in step S203, indexed point spread function data is selected from the database 105 in order, and the evaluation value of the block image is calculated by use of the point spread function data by the evaluation value calculating unit 104. Such an evaluation value refers to similarity between the point spread function data created from the block image and the point spread function data corresponding to each lens position selected from the database 105. Dissimilarity of two different point spread functions can be defined, for example, by using integral values of absolute values of differences between point spread functions or the total energy of the point spread functions relative to Euclidian distance. In step S203, the evaluation value of the block image is calculated in step S203-1, and then the obtained evaluation value is temporarily stored in the evaluation value processing unit 106 in step S203-2. As long as it is necessary to repeat the above processing, the procedure advances from step S203-3 to step S203-4, where the indices of the point spread function data to be read from the database 105 are updated, and returns to step S203-1 to perform loading again and repeat an evaluation value calculation.

After completing the evaluation value calculation, evaluation values obtained by the number of repetitions are held in the evaluation value processing unit 106. In step S204, the index of the point spread function indicating the highest evaluation value (the highest similarity) of the evaluation values is found. Since the index corresponds to the direction and the amount of defocus, the amount of movement of the lens for focus adjustment is determined based on the value in step S205. Thereafter, the lens is moved by the amount required to change the position in step S206. When a higher-accuracy focus adjustment is desired, the procedure returns from step S207 to step S202 to perform the same operation again. At that time, as the database 105 of the point spread functions, a higher-level database or the like may be used.

Alternatively, in step S211 branched from step S207, a hill-climbing AF based on contrast is selected, the focus adjusting stop 109 is allowed to stand by in step S212, the aperture of the stop is set at the same focus level as, or at an even higher focus level than that for image capturing in step S213, and the contrast-based hill-climbing AF operation is performed in step S214. Finally the stop is set for image capturing in step S209, and actual image capturing is performed in step S210. In contrast, when high-accuracy focus adjustment is not required in step S207, the focus adjusting stop 109 is allowed to stand by in step S208, the stop is set for image capturing in step S209, and actual image capturing is performed in step S210.

<Concrete Example of the Focus Adjustment According to an Embodiment>

Figures 4A, 4B:
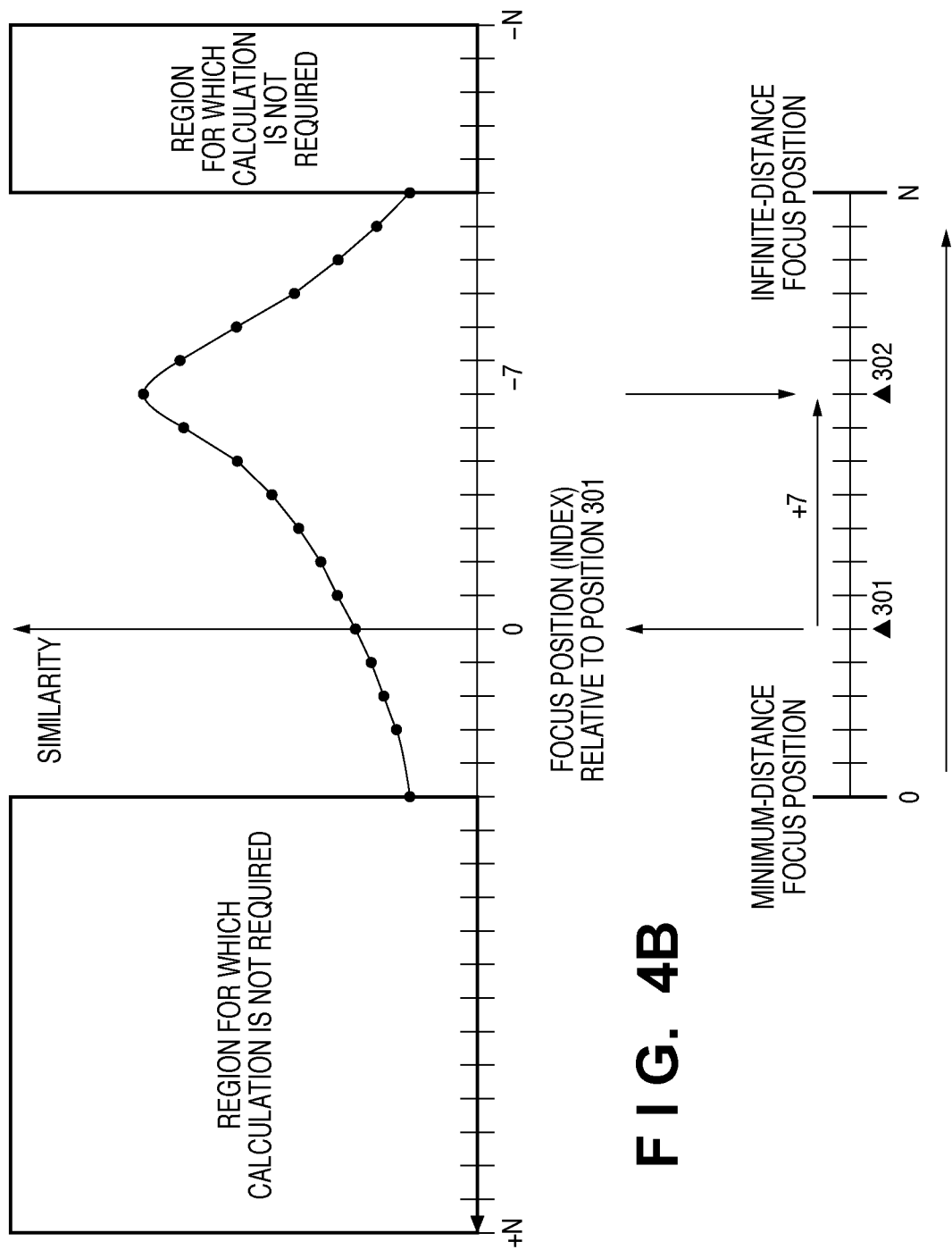
FIGS. 4A and 4B are graphs showing an example of focus adjustment operation according to an embodiment.

FIGS. 4A and 4B are each a graph showing an example of the focus adjustment performed in accordance with the flowchart of FIG. 3. In FIG. 4A, the horizontal axis indicates relative focus positions of the lens, where focus positions relative to the current position are indicated by dashes each representing any given unit. The vertical axis indicates evaluation values acquired by mathematical operations for focus calculations; specifically, the evaluation values correlate with degrees at which subjects are in focus (correlate with similarity between the point spread functions in this example). FIG. 4B is a graph showing the absolute focus position of the lens that lies between the minimum-distance focus position and the infinite-distance focus position. Reference numeral 301 denotes the initial position and, in this example, the initial position is not in the minimum-distance focus position nor in the infinite-distance focus position. Note that the initial position is determined based on the focus position at the time of the preceding image capture, the focus position at the time of confirmation of a subject with a viewfinder before image capture, or the like, and therefore the initial position is not necessarily in the same position all the time. Reference numeral 302 denotes the focus position at which it has been determined in this embodiment that a subject is best in focus.

Another Embodiment

An example will be described in which a subject image assumed to be in focus is restored by inversely transforming data on a captured subject image by point spread functions stored in a database, and a degree of validity of the restoration of the subject image as an evaluation value. Next, how the lens is moved from the initial position 301 to the focus position 302 of FIG. 4B in this embodiment will be described below.

To begin with, a subject image for which an evaluation value is to be calculated is captured when the focus adjusting lens is in the initial focus position 301. Next, an image of a certain region in which a subject is present within the viewfinder is captured and cut out. At that time, a certain focus adjusting stop 109 is used. Then the evaluation value that correlates with the direction and the amount of defocus is calculated using the cut-out subject image and the database of point spread functions. Specifically, first the obtained subject image is defined as a result of a convolution integral of the in-focus subject image and any given point spread function. The data on the obtained subject image is inversely transformed using a previously provided point spread function representing a state in which the lens is in focus and previously provided point spread functions representing a state in which the lens is out of focus by −N and +N to restore an subject image assumed to be in focus. Thereafter, the degree of validity of the restoration of the subject image is determined from the restored image as an evaluation value. An example of a method for calculating the evaluation value with which it is determined that the subject image has been restored with validity can be a method of using the total quantity of the high-frequency components of a signal representing the inversely transformed image data and a method of using the contrast components of the image data signal. At that time, the evaluation value may be calculated after removal of frequency components other than a spatial frequency component that can be included in the signal representing the subject image data and that depends on a MTF (modulation transfer function) of the entire optical system of the camera. Such removal is made so as not to be affected by the high-frequency components generated by noise in the image data signal and the contrast components.

Next, a concrete example of an algorithm for the evaluation value calculation will be described below. To begin with, the image after the inverse transformation is subjected to filtering using a high-cut filter to filter out the high-frequency components which are above the frequency band limit of the spatial frequency component depending on the optical system of the camera. Next, the average luminance of the image having been subjected to the filtering using the high-cut filter is calculated, and the brightness of the image is normalized. After the brightness normalization, the contrast component of an X direction (=a maximum luminance–a minimum luminance) of the image is calculated. Likewise, the contrast component in a Y direction (=a maximum luminance–a minimum luminance) is calculated. The sum of the contrast component in the X direction and the contrast component in the Y direction is set as the evaluation value. Incidentally, the filtering using the high-cut filter and the normalization of the image's brightness are not necessarily required.

In FIG. 4A, there are regions shown as regions for which calculation is not required, and for which calculation is not carried out. These regions are regions that are beyond the movement of the lens, that is, beyond the relative distances from the initial lens position 301 to the minimum-distance focus position and the infinite-distance focus position, and therefore these regions can be disregarded. In FIG. 4A, the plus side on the horizontal axis indicates a state in which an image sensing plane is relatively shifted backward (on the side of the infinite-distance focus point) from the focus adjusted position, and the minus side indicates a state in which an image sensing plane is relatively shifted forward (on the side of the minimum-distance focus point) from the focus adjusted position. The evaluation values are plotted on the vertical axis. A maximum evaluation value is given by image data inverse transformation using a point spread function representing the amount of a defocus of −7 points; that is, it can be seen that the focus can be adjusted by shifting the focus position from the current position by +7 points. Based on the above result, the focus position of the lens is shifted by +7 points so that the lens reaches a focus position 302. Thereafter, stop setting is changed from focus adjustment to image capturing or for the electronic viewfinder. On principle, focus adjustment can be performed by capturing a subject image only once, and therefore, the focus adjustment operation described in this embodiment can be called "one-shot AF".

In this embodiment, it is important to perform the above operation by use of the dedicated focus adjusting stop. The image capturing stop is designed to capture an image of a subject correctly or clearly and is, therefore, not suitable for the above evaluation value calculation. In the present invention, the one-shot AF is achieved using the dedicated focus adjusting stop when obtaining evaluation values. The dedicated focus adjusting stop is not suitable for capturing an image of a subject correctly or clearly, and thus a conventional stop is used when capturing images. As examples of a technique for performing the inverse transformation, there are various techniques such as a convolution integral with inverse functions of point spread functions (a deconvolution), a division in Fourier domain, the use of a limited least-square filter, and the use of a Wiener filter. This embodiment has an effect regardless of the method.

In the above example, inverse transformation is performed using the point spread functions with 1-point-step accuracy on the horizontal axis; however, in a case where higher focus adjustment accuracy is desired, the above mathematical operation can be carried out after preparation of a database of point spread functions provided in smaller point steps such as a 0.1 point step. Since an improvement in the focus adjustment accuracy leads to an increase in the mathematical operation time, for example, a method may be used which includes a step of performing a first focus adjustment with rough accuracy and a step of performing a second focus adjustment by using a database of focus spread functions provided in smaller point steps. In a case where higher focus adjustment accuracy is desired, a technique called "contrast AF" may be incorporated as a final focus adjustment. In that case, since the focus adjustment is performed only near a focus position at which the focus is to be attained, a considerable reduction in the quantity of mathematical operations can be achieved compared with a case where all the focus adjustment is carried out by means of only contrast AF. Moreover, after the changeover to contrast AF at the final step of the focus adjustment, AF accuracy is also very high because the image capturing stop or an aperture stop is used.

If the size of a cut-out image at the time of capturing an image of a region within the viewfinder and cutting out the image is too large, an object(s) other than the subject is included in the image, and if the size is too small, the subject cannot be correctly captured. In order to avoid such problems, it is possible to obtain images of a subject in a plurality of cut-out sizes, perform the foregoing operation on the subject images having different cut-out sizes in parallel, and determine the amount of movement to a focus position based on the plurality of operation results.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-199406, filed Sep. 6, 2010, which is hereby incorporated by reference herein in its entirety.

What is claimed is:

1. A focus adjustment apparatus for performing focus adjustment using a captured image and a plurality of point spread functions prepared in advance for each defocus direction and defocus amount, comprising
    a focus adjusting stop whose aperture does not have rotational symmetry about an optical axis,
    wherein focus adjustment is performed by comparing the plurality of point spread functions prepared in advance with a point spread function of an image captured using the focus adjusting stop and not having rotational symmetry about the optical axis, obtaining the defocus direction and the defocus amount, and performing the focus adjustment according to the obtained defocus direction and defocus amount.

2. The apparatus according to claim 1, wherein the focus adjusting stop has at least two apertures.

3. The apparatus according to claim 1, wherein the focus adjusting stop is realized by providing a focus adjusting stop aside from an image capturing stop used to capture and record images or by fitting an auxiliary stop including a blade or a mask to the image capturing stop when performing the focus adjustment.

4. An image capturing apparatus comprising:
    the focus adjustment apparatus according to claim 1;
    an image capturing lens unit; and
    a position changing unit configured to change the position of a focus adjusting lens of the image capturing lens unit in accordance with adjustment of the focus adjustment apparatus,
    wherein the position changing unit moves the focus adjusting lens in accordance with the defocus direction and the defocus amount obtained by the focus adjustment apparatus.

* * * * *